United States Patent [19]
Kuster et al.

[11] Patent Number: 5,881,757
[45] Date of Patent: Mar. 16, 1999

[54] PRESSURE REGULATOR APPARATUS AND METHOD

[75] Inventors: Arlene Kuster, Clermont; Mark Healy, Orlando; William McFadden, Clermont, all of Fla.

[73] Assignee: Senninger Irrigation, Inc., Orlando, Fla.

[21] Appl. No.: 850,180

[22] Filed: May 2, 1997

[51] Int. Cl.$^6$ .................................................. B65H 75/34
[52] U.S. Cl. ........................... 137/15; 251/904; 251/367; 137/454.2; 137/315; 137/505.25; 137/508
[58] Field of Search ................................. 251/367, 904; 137/508, 505.25, 315, 454.2, 15

[56] References Cited

U.S. PATENT DOCUMENTS

| Re. 30,552 | 3/1981 | Ludwig | 251/367 X |
|---|---|---|---|
| 2,676,614 | 4/1954 | Strauss et al. | 137/454.2 X |
| 2,966,371 | 12/1960 | Bruning | 284/19 |
| 3,184,217 | 5/1965 | Petrin | 251/367 |
| 3,792,717 | 2/1974 | Tibbals | 137/505.25 |
| 3,848,631 | 11/1974 | Fallon | 137/505.25 X |
| 3,978,880 | 9/1976 | Crown et al. | 137/454.2 X |
| 4,492,249 | 1/1985 | Arino et al. | 137/454.2 X |
| 4,543,985 | 10/1985 | Healy et al. | 137/505.25 |
| 5,092,361 | 3/1992 | Masuyama et al. | 251/904 X |
| 5,096,158 | 3/1992 | Burdick et al. | 251/904 X |
| 5,123,591 | 6/1992 | Reynolds | 137/454.2 X |
| 5,159,953 | 11/1992 | Sato et al. | 137/454.2 X |
| 5,257,646 | 11/1993 | Meyer | 137/505.25 |
| 5,348,044 | 9/1994 | Eugene et al. | 137/312 |
| 5,396,918 | 3/1995 | Parker | 137/505.25 X |

*Primary Examiner*—Denise L. Ferensic
*Assistant Examiner*—Ramyar Farid
*Attorney, Agent, or Firm*—William M. Hobby, III

[57] ABSTRACT

A pressure regulator apparatus has a pressure regulator mechanism which includes first and second housing portions, each made of substantially rigid material, such as a PVC polymer, and each housing portion having a passageway therethrough. One of the housing portions has a plurality of niches formed therein while a second housing portion has a plurality of raised wedged members formed thereon so that the pressure regulator mechanism can be placed in the two housings which can be driven together to drive the housing wedge members of one portion of the housing into the niches of the other portion of the housing. Since both housings have a cylindrical portion, the wedge members are sized to extend above the inner lip of the other housing portion to thereby require a forced expansion of the substantially rigid housing portion to drive the wedge members into the locking niches in the other housing member which simultaneously locks the pressure regulator mechanism into position in the housing.

17 Claims, 3 Drawing Sheets

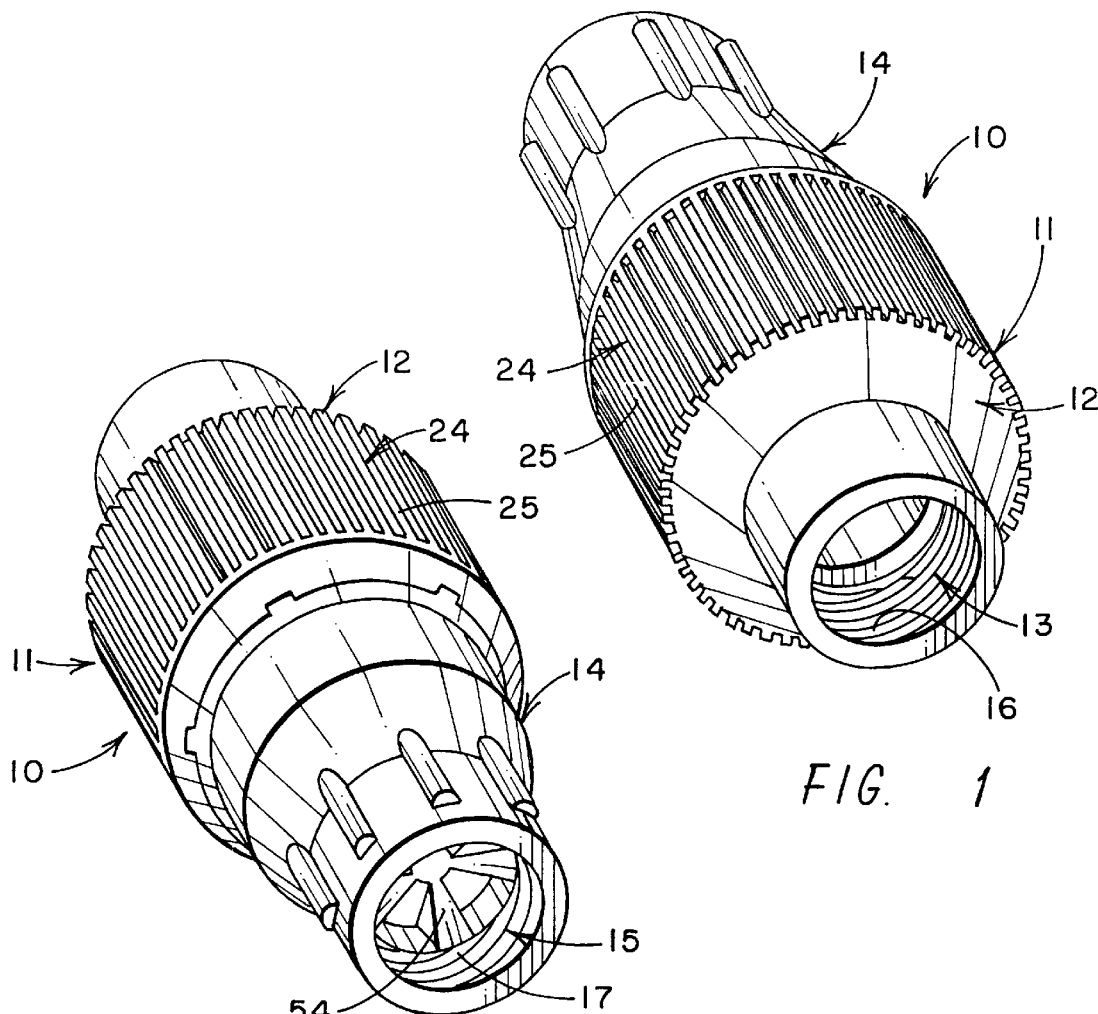
FIG. 1
FIG. 2
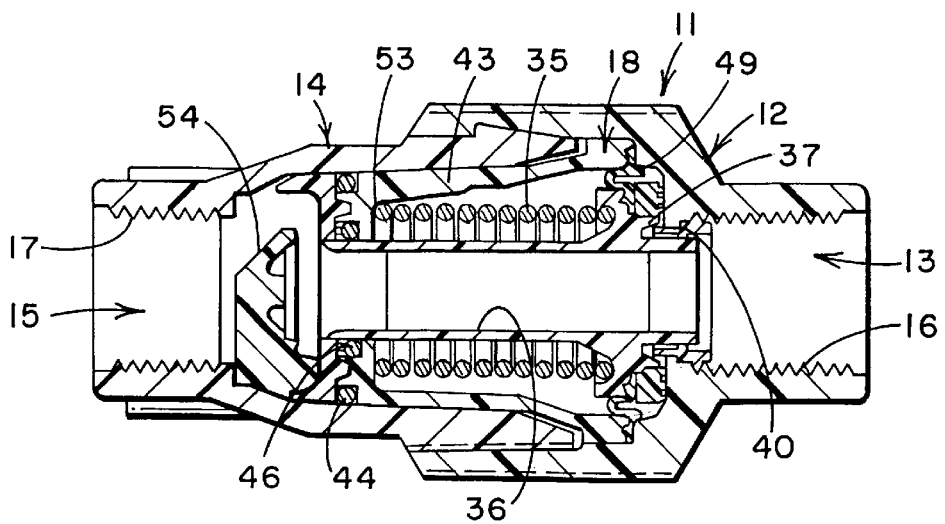
FIG. 3

5,881,757

PRESSURE REGULATOR APPARATUS AND METHOD

BACKGROUND OF THE INVENTION

The present invention relates to pressure regulators and especially to a pressure regulator apparatus and method of making a pressure regulator for a sprinkler system and having an inner connecting housing coupled with the pressure regulator mechanism so that two housing portions can be locked together to lock a pressure regulator mechanism in place.

In sprinkler irrigation systems, water is received from a source of water under pressure and is introduced into a main water supply pipe which is connected with one or more distributing pipes forming a fluid conduit. The irrigation system includes a plurality of discharge irrigation sprinkler heads. Water pressure throughout the pipe lines tends to vary for a variety of reasons and, as the pressure varies between two sprinklers having discharge orifices of exactly the same size, so does the output flow. The quantity of water discharged over any given period of time varies in relation to the variations in pressure, thus causing uneven distribution of water from a sprinkler system with a greater amount of water being discharged through sprinklers where the pressure is higher and a lesser amount through sprinklers where the pressure is lower. To counter this problem, pressure regulators have been developed which can be attached to the water line ahead of the sprinkler head to maintain constant pressure at the sprinkler head for all the sprinkler heads in the irrigation system.

There have been a great variety of fluid pressure regulators for regulating the flow of fluids through a pipe in irrigation systems. These pressure regulators typically rely on a spring biasing a piston or other member in a passageway for opening or closing a portion of the passageway. Passageways typically go around the piston and follow a circuitous passage. One prior art pressure regulator may be seen in Applicant's prior U.S. Pat. No. 4,543,985 of Oct. 1, 1985 which is for a pressure regulator having a housing having a passageway therethrough and having a spring biased throttling stem mounted in the housing passageway for adjusting the passageway through the throttling member seat so that fluid pressure is adjusted between the input and output of the fluid pressure regulator. The throttling stem also has a dampening member or pressure controller mounted in the passageway to dampen oscillations in the throttling stem.

The present application improves on this prior art pressure regulator by the addition of a housing which locks the pressure regulator mechanism into place without the use of screws and threaded fasteners for locking the components together and which prevents the loosening of the housing and the leakage by the loosening of the threaded housing fastening members.

There have been a variety of prior art coupling systems used with pressure regulators and fluid housings. In the Bruning U.S. Pat. No. 2,966,371, a longitudinal yieldable coupling is provided for connecting a female coupling part with a pair of opposed male coupling parts to provide a longitudinally yieldable coupling to compensate for differences in spacing of supports for the coupling parts. In the Eugene et al. U.S. Pat. No. 5,348,044, a sealed drainage unit is provided for a hydraulic circuit, such as a circuit for distributing drinking water on aircraft.

The present invention provides for a pressure regulator and a method of assembling a pressure regulator in which a pressure regulator mechanism is similar to the one taught in Applicant's prior patent which positions a pressure regulator mechanism between two housing portions which are then forced together to lock the pressure mechanism in place such that the pressure regulator can then be attached within a sprinkler irrigation system and which has a sealed housing which is not subject to leakage from the loosening of threaded members.

SUMMARY OF THE INVENTION

A pressure regulator apparatus has a pressure regulator mechanism encased between first and second housing portions, each housing portion is made of a substantially rigid material, such as a PVC polymer, and each housing portion has a passageway therethrough. One of the housing portions has a plurality of niches formed therein while a second housing portion has a plurality of raised wedged members formed thereon so that the pressure regulator mechanism can be placed in the two housings which can be driven together to drive the housing wedge members of one portion of the housing into the niches of the other portion of the housing. Since both housings have a cylindrical portion, the wedge members are sized to extend above the inner lip of the other housing portion to thereby require a forced expansion of the substantially rigid housing portion to drive the wedge members into the locking niches in the other housing member which simultaneously locks the pressure regulator mechanism into position in the housing.

BRIEF DESCRIPTION OF THE DRAWINGS

Other objects, features, and advantages of the present invention will be apparent from the written description and the drawings in which:

FIG. 1 is a perspective view of a pressure regulator in accordance with the present invention;

FIG. 2 is a perspective view of the pressure regulator of FIG. 1;

FIG. 3 is a sectional view of the pressure regulator of FIGS. 1 and 2;

DESCRIPTION OF THE PREFERRED EMBODIMENT

Figure 4:
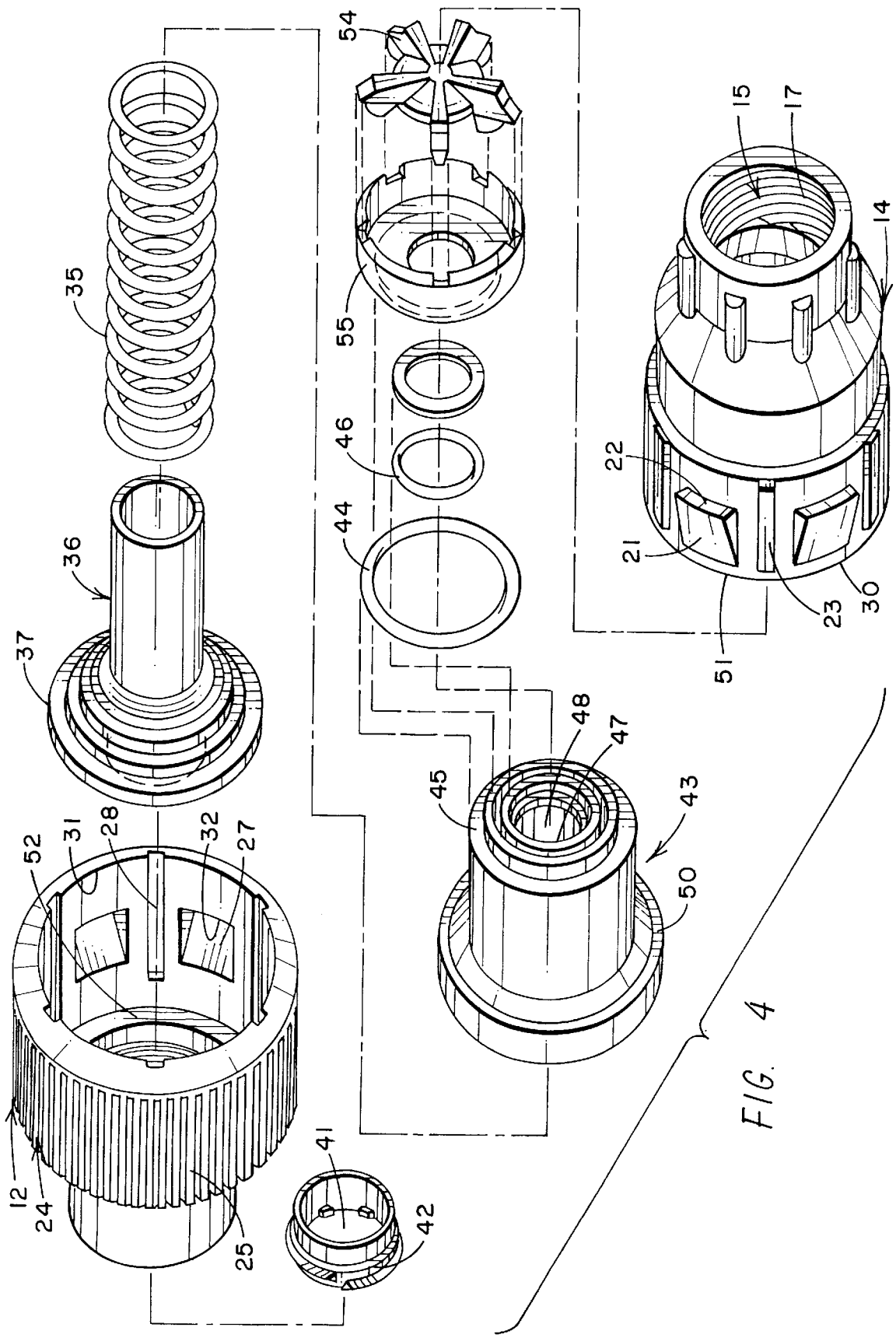
FIG. 4 is an exploded view of the pressure regulator of FIGS. 1–3.
Figure 5:
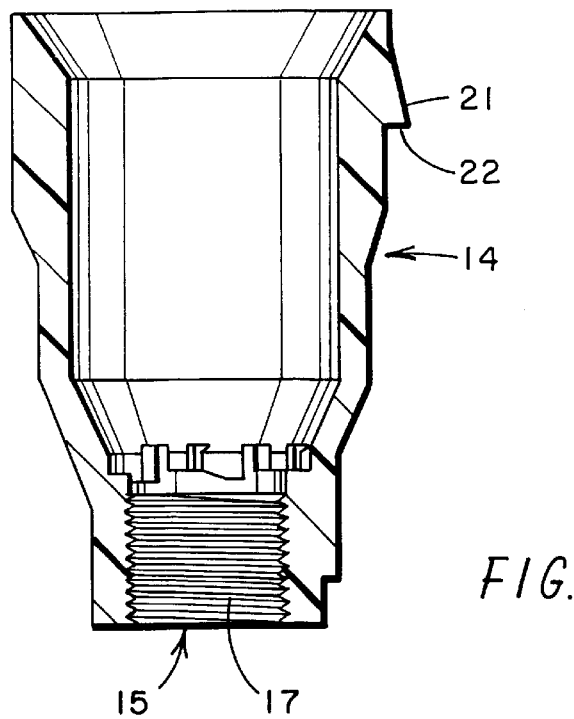
FIG. 5 is a sectional view of one housing section of the pressure regulating housing of FIGS. 1–4.
Figure 6:
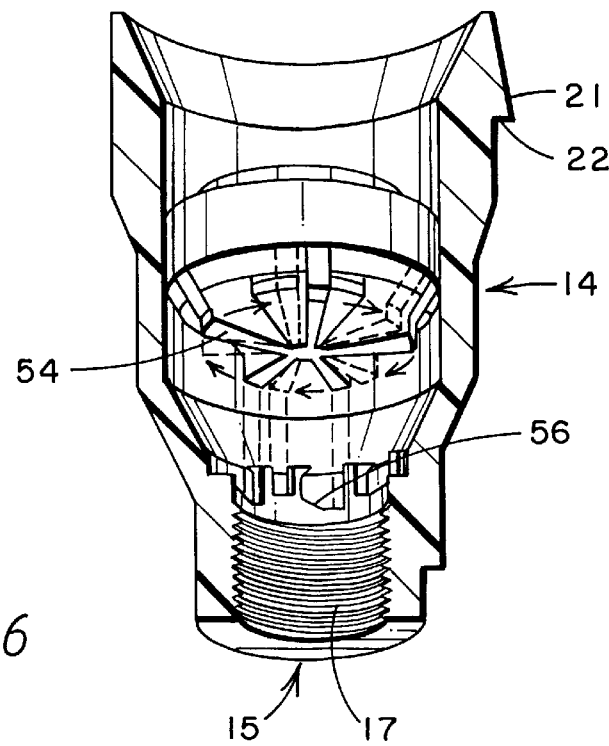
FIG. 6 is a sectional view of a second housing portion of the pressure regulator of FIGS. 1–4.

Referring to the drawings and especially to FIGS. 1, 2, 5 and 6, a pressure regulator 10 is illustrated having a housing 11 with an outlet portion 12 having a pressure regulator outlet 13. A pressure regulator housing portion 14 forms the inlet housing and has a water inlet 15. The pressure regulator 10 is for an irrigation sprinkler system such that the housing outlet 13 has internal threads 16 while the pressure regulator housing 14 inlet 15 has internal threads 17. The threaded outlet 13 and threaded inlet 15 allow the pressure regulator 10 to be threadedly attached into the water line of a sprinkler system to regulate the pressure of the water passing therethrough.

The pressure regulator 10 housing 11 has the pressure regulator mechanism 18 mounted inside the housing 11, as seen in FIG. 3. The pressure regulator housing inlet portion 14 has a generally cylindrical connecting portion 20 having a plurality of wedges 21 formed on the exterior of the casing portion 20, each having a ledge 22. In addition, a plurality of ridges 23 are formed between each of the wedges 21. The pressure regulator housing portion 12, as seen in FIG. 4, has a gripping surface 24 formed on the exterior side thereof which is in the form of a plurality of ridges and grooves 25 for gripping the case for rotating or holding the case for threading a water connection line to the pressure regulator. The housing portion 12 has a generally cylindrical portion 26 having a plurality of internal niches 27 which are each formed having an internal wedge shape and each positioned to align with one of the wedges 21 on the inlet housing 14. In addition, a plurality of elongated grooves 28 are formed in the housing 12 on the internal wall thereof between the niches 27 and for alignment with the ridges 23 of the inlet housing portion 14. The generally cylindrical surface 30 of the housing portion 14 is sized to fit into the interior cylindrical wall 31 of the housing portion 12 with a very close tolerance which thereby leaves the wedge portions 21 protruding outside the interior wall 31. The housing portions 12 and 14 are made of a substantially rigid material, such as a PVC polymer, so that to attach the housing portion 14 to the housing portion 12, requires that the ridge portions 23 be aligned with the grooves 28 of the housing 12 which thereby aligns the wedge portions 21 with niche portions 27 and allows the housing 14 to be forced into the housing 12 under sufficient force to expand the housing interior walls 31 adjacent the wedges 21 and to compress the top surface of the wedges 21 to drive the wedges 21 into the niches 27 with ledge 22 locked into the ledges 32 of the niches 27. Since the materials are substantially rigid materials, a larger amount of force is required to drive the housing portions together to cause the expansion of the material but the housing portions are locked together such that they will not later loosen. In the method, the housings are attached with the pressure regulator mechanism 18 positioned thereinside so that the pressure regulator is fully assembled when the housings are driven together. The housings cannot thereby be disassembled in the field and will not loosen with the loosening of screws or the softening of adhesives.

Turning to FIGS. 3 and 4, the pressure regulator mechanism has a compression spring 35 riding on a throttling stem 36 having a flanged portion 37 for holding one end 38 of the spring 35 thereagainst. The flange portion 37 also has an annular groove 40 formed therein which rides in the annular pressure dampener 41 which has a threaded edge 42 attached in the threads 13 of the outlet housing 12. A pressure regulator mechanism housing portion 43 has an O-ring 44 mounted around one end 45 and an O-ring seal 46 mounted within an annular groove 47. The passageway 48 is supported over the compression spring 35, as seen in FIG. 3, and a flange area 50 is supported between the lip 51 on the housing 14 and the internal ledge 52 inside the housing portion 12, as seen in FIG. 3, and supports the other end of the spring 50 on an annular supporting ledge 53. A throttling seat 54 rides in a support 55 and is mounted inside the housing portion 14. The pressure of the water passing through the pressure regulator 10 is adjusted by the movement of the throttling stem against which a diaphragm 49 is squeezed between the cup 43 and the housing 12 inner surface 52 forming part of the watertight seal, along with "O" rings 44 and 46. The diaphragm is also part of the area which has the outlet pressure applied thereagainst (along with the flanged area 37 of the T-stem 36) to compress the spring and partially close the passage between the T-stem 36 and the seat 54, until a balance is attained between the regulated PSI times the T-stem/diaphragm area and the compressed spring force. After housing portions 12 and 14 are attached together, the seat 54 can be rotated with an external tool and will ride up a ramp 56 in the housing 14 to ensure a tight squeeze and seal of the diaphragm between the upper housing 12 surface 52 and the cup 43.

The method of making a pressure regulator in accordance with the present invention includes the selecting of a first housing 12 was illustrated in the drawing made of a substantially rigid material and having a pair of open ends in a passageway therethrough with a plurality of niches 27 formed therein and a plurality of alignment grooves 28 formed between the niches 27 and then selecting or making a second housing portion 14 made of a substantially rigid material and having a pair of open ends and a passageway therethrough and having a plurality of raised wedge members 21 formed therein having ledges 22 and also having a plurality of ridges 23 formed between the wedges 21 for matching alignment with the grooves 28 in the housing portion 12. A pressure regulator mechanism is selected and inserted between the selected housing portions. The selected housing portions have the ridges 23 aligned with the grooves 28 and then the two housing portions are forced to drive the housing portion 14 into the housing portion 12 with sufficient force so that the wedges 21 which are extending past the interior wall surface 31 of housing portion 12, forces the expansion of the substantially rigid material to drive the wedge portions into the niches 27. Since the polymer material has a memory, the materials reshape to lock the housing portions together while forming a seal against the leakage of water with the diaphragm 49 locked between housings 12 and 14 and preventing the housing from being disassembled in the field. The forming of the gripping surface 24 with the elongated grooves 25 allows the pressure regulator to be gripped by hand or with tools for holding or rotating to threadedly attach the pressure regulator into a water pressure line. The method also includes the selection of a pressure regulator mechanism having the ledge 50 sized to be locked into the housing between the lip 51 of the housing portion 14 and the ledge 52 of the housing portion 12 when the housing portion are locked together.

It should be clear at this time that a pressure regulator apparatus has been provided which provides for ease of manufacture with an improved reliability of the housing for holding the pressure regulator and also to a method of making a pressure regulator which cannot be easily disassembled in the field. However, the present invention should not be construed to the forms shown which are to be considered illustrative rather than restrictive.

We claim:

1. A pressure regulator comprising:

a pressure regulator mechanism having a regulator housing having a flange on one end thereon;

a first housing portion made of substantially rigid material and having a pair of open ends and a passageway therethrough having a ledge therein shaped to receive said regulator housing flange thereagainst and having a plurality of niches formed therein, said first housing portion having a plurality of parallel interior grooves positioned between pairs of said wall niches and having a portion of said pressure regulator mechanism positioned thereinside; and a second housing portion made of a substantially rigid material and having a pair of open ends and a passageway therethrough and shaped to have one open end slide into one open end of said first housing portion and having a plurality of raised wedge members formed thereon having a plurality of parallel spaced ridges thereon positioned to engage said first housing interior grooves and having a portion of said pressure regulator mechanism positioned thereinside having said regulator housing flange extending over one said second housing open end and said second housing portion raised wedge members being attached into said first housing portion niches to lock said regulator housing flange between said first housing portion ledge and said second housing portion one open end, whereby said pressure regulator mechanism is held inside a housing between open ends thereof by attached first and second housing portions.

2. A pressure regulator in accordance with claim 1 in which said first housing portion has an interior wall having said plurality of niches therein, each having a ledge formed therein.

3. A pressure regulator in accordance with claim 2 in which said second housing portion has an exterior wall having said plurality of raised wedges thereon, each having a ledge formed thereon.

4. A pressure regulator in accordance with claim 3 in which said first housing portion has a generally cylindrical end portion having an interior wall and said second housing portion having a generally cylindrical end portion sized to fit inside said first housing portion and said second housing portion having said raised wedge members extending above the interior wall of said first housing portion.

5. A pressure regulator in accordance with claim 4 in which said second housing portion has a plurality of exterior ridges formed thereon positioned between pairs of said raised wedge members and positioned to fit into said first housing portion plurality of interior grooves.

6. A pressure regulator in accordance with claim 5 in which said first housing portion has an exterior gripping surface formed thereon.

7. A pressure regulator in accordance with claim 6 in which said first housing portion exterior gripping surface includes a plurality of ridges formed thereon.

8. A method of making a pressure regulator comprising:

selecting a pressure regulator mechanism of predetermined shape to fit inside a predetermined housing and having a regulator housing having a flange thereon;

selecting a first housing portion made of substantially rigid material and having a pair of open ends and a passageway therethrough, said selected first housing portion having a plurality of niches formed therein and having a ledge formed therein, and said selected first housing portion having a plurality of parallel interior grooves positioned between pairs of said niches;

selecting a second housing portion made of a substantially rigid material and having a pair of open ends and a passageway therethrough and having a plurality of raised wedge members formed thereon and having a plurality of parallel spaced ridges therein positioned to slidably engage said first housing interior grooves;

inserting said pressure regulator mechanism into one open end of said second housing portion with the regulator housing flange extending over one end thereof and into one open end of said first housing portion with said regulator housing flange facing said first housing portion ledge;

slidably engaging said second housing portion plurality of parallel spaced ridges with said first housing portion plurality of parallel interior grooves; and forcing said second housing portion into said first housing portion to expand a portion of said first housing portion substantially rigid material adjacent said second housing portion plurality of raised wedge members to drive said wedge members into said niches to lock said pressure regulator housing together with said pressure regulator mechanism mounted thereinside having said regulator housing flange locked between said first housing ledge and one said second housing open end.

9. A method of making a pressure regulator in accordance with claim 8 including selecting a first housing portion having an interior wall having said plurality of niches therein, each said niche having a ledge formed therein.

10. A method of making a pressure regulator in accordance with claim 9 including selecting a second housing portion having an exterior wall having said raised wedges thereon, each said wedge having a ledge thereon.

11. A method of making pressure a regulator in accordance with claim 10 including selecting first and second housing portions each having a generally cylindrical end portion sized to fit one inside the other and said second housing portion having raised wedges extending above the edge of the interior wall of said first wall portion.

12. A method of making a pressure regulator in accordance with claim 11 including selecting a first housing portion having said plurality of interior wall niches positioned to align with said second wall portion plurality of raised wedges whereby said raised wedges are locked in said wall niches to prevent rotation of said first and second wall portions relative to each other.

13. A method of making pressure regulator in accordance with claim 12 including selecting second housing portion having spaced ridges formed thereon.

14. A pressure regulator in accordance with claim 13 in which said first housing portion has a plurality of interior grooves positioned between pairs of wall niches.

15. A method of making pressure regulator in accordance with claim 14 including selecting a second housing portion having a plurality of exterior ridges formed thereon positioned between pairs of raised wall wedges and positioned to fit into said first housing portion plurality of interior grooves.

16. A method of making pressure regulator in accordance with claim 15 including selecting a first housing portion having an exterior gripping surface formed thereon.

17. A method of making pressure regulator in accordance with claim 15 including selecting a first housing portion exterior gripping surface having a plurality of ridges formed thereon.

* * * * *